(12) United States Patent
Rajan et al.

(10) Patent No.: US 8,260,335 B2
(45) Date of Patent: Sep. 4, 2012

(54) METHOD OF CONSTRUCTING A QUICKCONFIG MESSAGE IN A 1XEVOLUTION DATA ONLY (1XEV-DO) COMMUNICATION NETWORK AND METHOD OF REDUCING CALL AND HANDOFF FAILURE RATES IN THE 1XEV-DO NETWORK WITHOUT INTRODUCING ADDITIONAL CALL SETUP LATENCIES

(75) Inventors: Priya Rajan, Somerset, NJ (US); Ramakrishna Vishnuvajjala, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 1030 days.

(21) Appl. No.: 11/723,647

(22) Filed: Mar. 21, 2007

(65) Prior Publication Data

US 2008/0233936 A1    Sep. 25, 2008

(51) Int. Cl.
*H04B 7/00* (2006.01)
(52) U.S. Cl. ...................................... 455/515
(58) Field of Classification Search ............ 455/515
See application file for complete search history.

(56) References Cited

U.S. PATENT DOCUMENTS

| | | | |
|---|---|---|---|
| 2003/0017831 A1* | 1/2003 | Lee et al. | 455/453 |
| 2006/0233150 A1 | 10/2006 | Cherian | |

FOREIGN PATENT DOCUMENTS

| | | |
|---|---|---|
| JP | 2005-508588 | 3/2005 |
| WO | WO 03/009633 A1 | 1/2003 |

OTHER PUBLICATIONS

TIA Document CDMA2000 Specification (Mar. 2004).*
Notification of Transmittal of the International Search Report and the Written Opinion of the International Searching Authorization mailed Sep. 11, 2008 in corresponding International Application No. PCT/US2008/003658.
Office Action issued Dec. 31, 2011, in corresponding Chinese Patent Application No. 200880009122.X, and English translation of the Examiner's comments.
Japanese Office Action issued Mar. 26, 2012, in corresponding Japanese Patent Application No. 2009-554573, and English translation thereof.

* cited by examiner

*Primary Examiner* — Marisol Figueroa
(74) *Attorney, Agent, or Firm* — Harness, Dickey & Pierce, P.L.C.

(57) ABSTRACT

In a method of constructing a QuickConfig message in a 1x Evolution (1XEV) data only (EV-DO) communication network for broadcast by a base station of the network to a plurality of users served thereby, a Forward Traffic Valid (FTValid) bit in a field of the QuickConfig message is set to a default value of a logic high state for all users. No delay occurs for a call setup between a given user and the base station even if the user requests the call setup after the Quick-Config message has been constructed by the base station.

6 Claims, 3 Drawing Sheets

METHOD OF CONSTRUCTING A QUICKCONFIG MESSAGE IN A 1XEVOLUTION DATA ONLY (1XEV-DO) COMMUNICATION NETWORK AND METHOD OF REDUCING CALL AND HANDOFF FAILURE RATES IN THE 1XEV-DO NETWORK WITHOUT INTRODUCING ADDITIONAL CALL SETUP LATENCIES

BACKGROUND OF THE INVENTION

1. Field of the Invention

Example embodiments relate generally to a method of method of constructing a QuickConfig message in a 1x Evolution Data Only (EV-DO) communication network and method of reducing call and handoff failure rates in the 1xEV-DO network without introducing additional call setup latencies 2. Description of the Related Art High Data Rate (HDR) is a technology originally developed for dedicated packet data applications to meet the increasing demand for wireless Internet Protocol (IP) connectivity with high spectral efficiency. Voice transmissions require low data rates, but maintain stringent delay and jitter requirements. Packet data transmissions, on the other hand, typically require bursty high data rates, with less stringent delay and jitter requirements. The HDR principle is to separate high-speed data completely from the voice network, so that the packet data requirements can be fulfilled optimally and independently.

In May 2000, the Code Division Multiple Access (CDMA) Development Group accepted HDR as the 1x Evolution (1xEV) data only (DO) system, with minor requirements for improvements. The 1x Evolution (1xEV) data only (DO) or 1xEV-DO system allows cellular service provider carriers to use one or more IS-95 CDMA radio channels to provide broadband high-speed data services to their customers. The EV-DO network is an "always-on" system that allows users to browse the Internet without complicated dialup connections. Within a 1x-EV-DO network, a high-data rate base station, whether a stand-alone node or integrated within a voice base station, operates on a 1.25 MHZ carrier that is allocated for packet data only.

The base station further employs a single shared, time division multiplexed (TDM) forward link, where only a single mobile terminal is served at any instance. The forward link throughput rate is shared by all mobile terminals. A mobile terminal selects a serving sector (or cell) of the base station by pointing its Data Rate Control (DRC) to the sector and requesting a forward data rate according to the channel condition (i.e., based on the Carrier to Interference (C/I) ratio of the channel).

FIG. 1 illustrates a Code Division Multiple Access 2000 (CDMA2000) network 100. For the purposes of illustration, the CDMA2000 network 100 operates according to the Third Generation Partnership Project (3GPP) cdma2000 Multi-Carrier Requirements in Code Division Multiple Access (CDMA) nxEV-DO (Evolution Data-Only) networks, and provides High Rate Packet Data services. The network 100 includes one or more mobile terminals (MTs) 130 in communication with an access network (AN) or base station 120. In cdma2000 systems, the mobile terminal (also known as an access terminal) is equivalent to a mobile station, and the access network is equivalent to a base station.

The CDMA2000 network 100 supports data rates up to 2 Mbps per user and uses higher order modulation schemes and a base station 120 to support such high data rates. The base station 120 provides the RF air interface (carrier 115) between a mobile terminal 130 and the network 100 via one or more transceivers. The base station 120 provides a separate 1.25 MHZ data only (DO) carrier 115 (air interface) for HDR applications for each sector 110 (or cell) served by the base station 120. A separate base station or carrier (not shown) provides the voice carrier(s) for voice applications.

The mobile terminal 130 may be a DO mobile terminal or a dual mode mobile terminal capable of utilizing both voice services and data services. To engage in a data session, the mobile terminal 130 connects to a DO carrier 115 (air interface) to use the DO high-speed data service. The data session is controlled by a Packet Data Service Node (PDSN) 160, which routes all data packets between the HDR mobile terminal 130 and the Internet 180. The PDSN 160 has a direct connection to a Packet Control Function (PCF) (not shown), which interfaces with a Base Station Controller (base station 120C) 150 of the base station 120. The base station 120C 150 is responsible for operation, maintenance and administration of the base station 120, speech coding, rate adaptation and handling of the radio resources. It should be understood that the base station 120C 150 may be a separate node or may be co-located with one or more base stations 120.

Each base station 120 is shown serving three sectors 115 (or cells). However, it should be understood that each base station 120 may serve only a single cell (referred to as an omni cell). It should also be understood that the network 100 may include multiple base stations 120, each serving one or more sectors 115, with mobile terminals 130 being capable of handing off between sectors 110 of the same base station 120 or sectors 110 of different base stations 120. For each sector 110 (or cell), the base station 120 further employs a single shared, time division multiplexed (TDM) forward link, where only a single mobile terminal 130 is served at any instance. The forward link throughput rate is shared by all mobile terminals 130. A mobile terminal 130 selects a serving sector 110 (or cell) of the base station 120 by pointing its Data Rate Control (DRC) towards the sector 115 and requesting a forward data rate according to the channel conditions (i.e., based on the Carrier to Interference (C/I) ratio of the channel).

FIG. 2 is a block diagram of a base station serving multiple mobile terminals in accordance with example embodiments of the present invention. FIG. 2 shows the base station 120 serving multiple mobile terminals 130 (MT-A, MT-B, MT-C and MT-D), each having their DRC 135 pointed at one sector 115 (sector 1) of the base station 120. The default Forward Traffic Channel Medium Access Control (FTCMAC) Protocol of the CDMA2000 network 100 defines the procedures required for the base station 120 to transmit and the mobile terminal 130 to receive the Forward Traffic Channel (FTC). This protocol operates in one of three states: (1) Inactive State, (2) Variable Rate State, and (3) Fixed Rate State: In the Inactive State, the mobile terminal 130 is not assigned a Forward Traffic Channel. In the Variable Rate State, the base station 120 transmits the Forward Traffic Channel to the mobile terminal 130 at a variable rate, as a function of the mobile terminal's DRC 135 value. In the Fixed Rate State, the base station 120 transmits the Forward Traffic Channel to the mobile terminal 130 from one particular sector 115, at one particular rate.

Once the mobile terminal 130 has pointed its DRC 135 towards a particular sector 115 specifying a requested rate, the base station 120 transmits data packets to the mobile terminal 130 on the forward traffic channel at the requested data rate. As discussed above, transmission on the forward traffic channel is time division multiplexed. At any given time, the forward traffic channel is being either transmitted or not; and if it is being transmitted, it is addressed to a single mobile terminal 130. When transmitting on the forward traffic channel, the base station 120 uses a MACIndex associated with a particular mobile terminal 130 to identify the target mobile terminal 130 for the data packets. A MACIndex is a representation of a resource that's allocated for either traffic channels or control channels. There are a maximum of 64 MAC indices defined in the standard, out of which 59 can be used for traffic channels.

FIG. 3 is a block diagram illustrating the transmission of a QuickConfig message to a mobile terminal. As shown in FIG. 3, the base station 120C 150 transmits to each of the selected mobile terminals 130 a message 145 indicating that the selected mobile terminals 130 should stop pointing their DRC 135 towards that sector 115. The message 145 is transmitted on a control channel 118 of the forward link of the base station 120. Each control channel packet contains zero or more control packets for zero or more mobile terminals 130. The control packets include messages 145 that are broadcast to mobile terminals 130 within the sector 115 over the control channel 118.

One type of message included in a control packet is an overhead message. The overhead messages in the CDMA2000 network 100 include the QuickConfig message 145 and the SectorParameters message. The SectorParameters message is used to convey sector specific information to the HDR mobile terminals 130. The QuickConfig message 145 is used to indicate a change in the contents of the overhead messages and to provide frequently changing information.

FIG. 4 illustrates the setting of each of the fields in the message shown in FIG. 3. As shown in FIG. 4, the QuickConfig message 145 includes a number of fields 148 and a setting 149 for each of the fields 148. The Message ID field indicates that the message is a QuickConfig message. The Color Code and Sector ID fields indicate the color code and ID of the sector 115 transmitting the QuickConfig message 145. The Sector Signature field is set to the value of the Sector Signature field of the next SectorParameters message that will be transmitted.

Similarly, the Access Signature field is set to the value of the Access Signature parameter from the AccessParameters message, which is transmitted on an Access Channel (not shown) of the forward link. The Redirect field is used to indicate whether or not the network 100 is redirecting all mobile terminals 130 away from the sector 115.

The RPC Count field is set to the maximum number of Reverse Power Control (RPC) channels supported by the sector 115. For each RPC Count occurrence (i.e., for each mobile terminal), a DRC Lock field is set to "1" if the network 100 has received a valid DRC 135 from the mobile terminal 130 that has been assigned a MACIndex. Each occurrence n of the DRC Lock field is associated with MACIndex 64-n (e.g., occurrence 1 of this field corresponds to MACIndex 63). Otherwise, the DRC Lock field is set to "0". Similarly, for each RPC Count occurrence n, a Forward Traffic (FT) Valid field is set to "1" if the forward traffic channel associated with MACIndex 64-n is valid. The Reserved field includes six bits and is usually set to zero.

Accordingly, in EV-DO systems such as the CDMA2000 network 100 shown in FIGS. 1-3, the QuickConfig message 145 is sent by the base station 120 as part of the broadcast control channel or overhead messages. In the QuickConfig message 145, the FTValid field is used for Forward Traffic Channel MAC (FTCMAC) layer supervision.

Based on how the base station 120 software is structured into application software and driver software (which can potentially run on different processors at the base station 120), the application software at base station 120 has to construct the QuickConfig message 145 at what is referred to as a control channel "buildback" time ("first timing"). This first timing is a few slots before the start of the control channel cycle for transmission by the driver software over the air interface 115 at a control channel start time ("second timing" e.g., the start time of the next control channel cycle).

A time interval between the first and second timings can be understood as a control channel build interval (T). If any call allocation for a mobile terminal 130 occurs during this interval T, then the QuickConfig message 145 has already been constructed for transmission in the subsequent control channel cycle.

The FTValid bit in the FTValid field of the QuickConfig message 145 is set based on the set of open traffic channels on the base station 120. Thus, for mobile terminals 130 whose traffic channels are first opened during the control channel build interval T, their traffic channel was not open at the first timing when the QuickConfig message was originally constructed. Hence, the FTValid bit is not set in the QuickConfig message 145 for mobile terminals 130 whose traffic channels were first opened during the control channel build interval T. This can lead to FTCMAC layer supervision errors at the mobile terminal 130, causing call or handoff failures.

For example, FTCMAC layer supervision at the mobile terminal 130 starts as soon as mobile terminal 130 receives a TrafficChannelAssignment (TCA) message. At that point, the mobile terminal 130 starts monitoring the FTValid bit in the QuickConfig message, which as noted above is received as part of broadcast control channel messages. If the bit in the FTValid field in the QuickConfig message 145 is set to false, i.e., a logic low or "0", then the mobile terminal 130 assumes a failure in FTCMAC layer supervision and drops the call on its side. This causes a call failure in an EV-DO system such as network 100.

Thus, in the existing method of constructing the QuickConfig message 145 in the base station 120, if the allocation of traffic channel resources on the base station 120 and transmission of the TCA message to a mobile terminal 130 informing the mobile terminal 130 about allocation of traffic channel resources happens during the control channel build interval T, then the mobile terminal 130 will fail FTCMAC layer supervision. This is because the QuickConfig message 145 sent by the base station 120 will have the bit in the FTValid field set to false. In other words, the mobile terminal 130 drops the call.

A possible way to avoid this is to delay the transmission of the TCA to the mobile terminal 130 to beyond the second timing at which the next control channel cycle starts, i.e., push it to outside the control channel build interval T. However, in a worst case scenario this causes a significant delay of the control channel build interval T for call setup. For delay sensitive applications such as Push-To-Talk (PTT), this setup delay may be unacceptable and would hold up system resources for a longer duration, preventing these resources from being allocated to other calls.

SUMMARY OF THE INVENTION

An example embodiment is directed to a method of constructing a QuickConfig message in a 1x Evolution (1XEV) data only (EV-DO) communication network for broadcast by a base station of the network to a plurality of users served thereby. In the method, a Forward Traffic Valid (FTValid) bit in a field of the QuickConfig message is set to a default value of a logic high state for all users.

Another example embodiment is directed to A method of reducing call and handoff failure rates in a 1xEV-DO communication network without introducing additional call setup latencies. In the method, a FTValid bit in a field of the Quick- Config message being constructed by a base station of the network is set to a default value of a logic high state for all users being served by the base station. The QuickConfig message is transmitted to the users being served thereby. No delay occurs for a call setup between a given user and the base station even if the user requests the call setup after the Quick-Config message has been constructed by the base station.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

Figure 1:
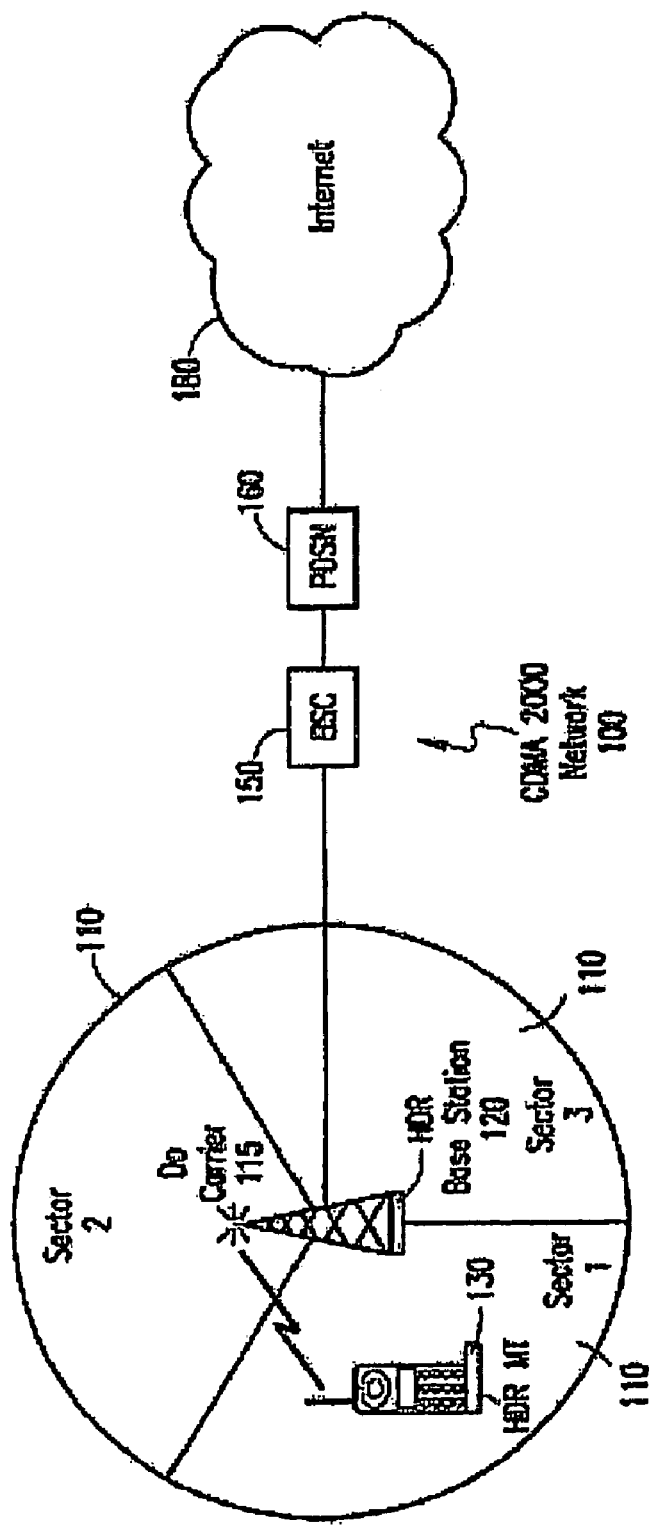
FIG. 1 illustrates a Code Division Multiple Access 2000 (CDMA2000) network 100.
Figure 2:
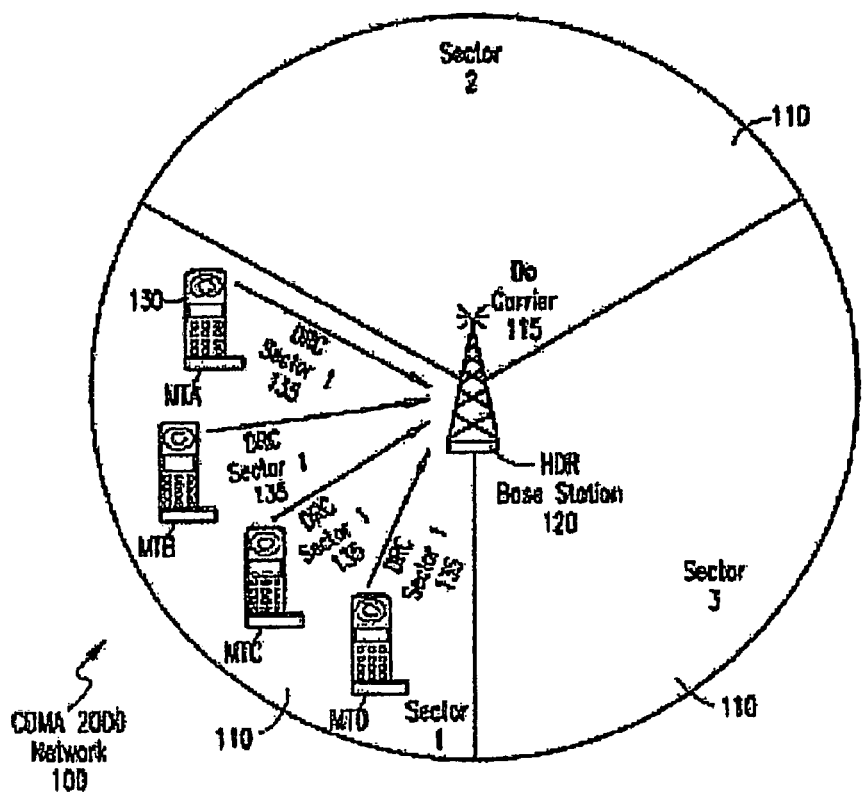
FIG. 2 is a block diagram of a base station serving multiple mobile terminals in accordance with example embodiments of the present invention.
Figure 3:
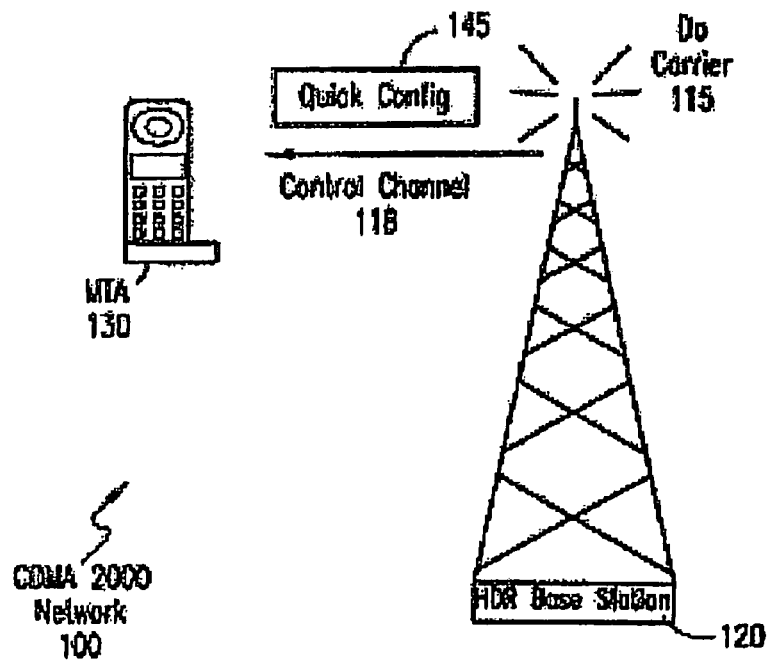
FIG. 3 is a block diagram illustrating the transmission of a QuickConfig message to a mobile terminal.
Figures 4, 5:
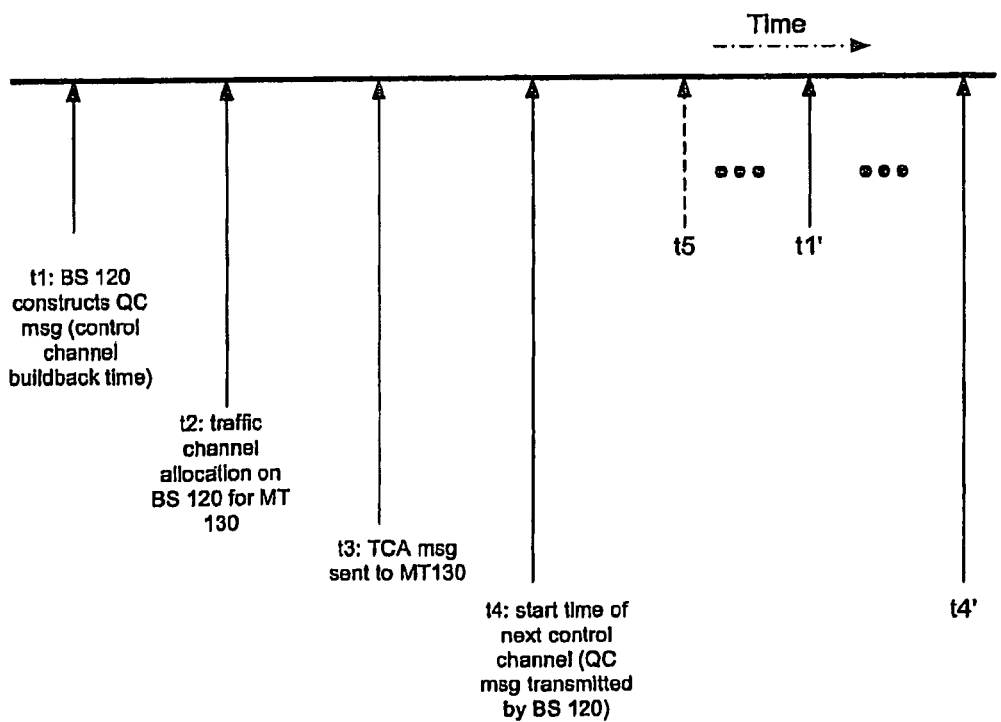
FIG. 4 illustrates the setting of each of the fields in the message shown in FIG. 3.
FIG. 5 is a timing diagram for describing a method for configuring a QuickConfig message, in accordance with the example embodiments.

FIG. 5 is a timing diagram for describing a method for configuring a QuickConfig message, in accordance with the example embodiments. The example method for configuring a QuickConfig message avoids the issue where an FTValid bit is not set in the QuickConfig message 145 for mobile terminals 130 whose traffic channels were first opened during the control channel build interval T, leading to FTCMAC layer supervision errors at the mobile terminal 130 which can cause call or handoff failures. As will be seen in FIG. 5, the example method avoids this issue by inverting the way FTValid bits are set in the QuickConfig message 145, as compared to what is being done in all current EV-DO systems such as network 100.

In general, an FTValid bit set to true indicates that the call resource is allocated on the base station 120 for the mobile terminal 130 and the mobile terminal 130 will not fail the FTCMAC layer supervision. An FTValid bit set to false indicates that the call resource is not allocated on base station 120 for the mobile terminal 130 and the mobile terminal 130 will fail the FTCMAC layer supervision. Currently, the FTValid is set to false by default if a call is not allocated at a MACIndex (i.e., the resource allocated for a call at base station 120). In the current implementation, the FTValid bit is only set to true once the MACIndex resource has been allocated to a mobile terminal 130 during a call setup.

The example method for configuring a QuickConfig message sets the bit in the FTValid field to a default value of true, i.e., a logic high or "1" for all MAC indices by default. The FTValid bit is toggled to false (logic low or "0") only when a MACIndex is in the process of de-allocation. In other words, the logic of setting the FTValid bits in the QuickConfig message 145 is different than the current approach. Since by default the FTValid bit is set to true, even if a call is setup during control channel build interval T, it will not cause a FTCMAC layer supervision failure.

Accordingly, in the example method of constructing a QuickConfig message in a 1x Evolution (1XEV) data only (EV-DO) communication system for broadcast by the base station 120 to a plurality of mobile terminals 130 (i.e., users) served thereby, the FTValid bit in the field of the QuickConfig message 145 is set to a default value of a logic high state for all the mobile terminals 130.

Alternatively, the example methodology can also be considered a method of reducing call and handoff failure rates in an EV-DO network without introducing additional call setup latencies. Specifically, the base station 120 of the network 100 sets the FTValid bit in a field of the QuickConfig message 145 it is constructing to the default value of the logic high state. The QuickConfig message 145 is then transmitted to all the mobile terminals 130 being served thereby. Accordingly, any mobile terminal 130 requesting to set up a call after the QuickConfig message 145 has been constructed will not fail FTCMAC layer supervision and cause no delay in call setup. In other words, no delay occurs for a call setup between a given mobile terminal 130 and the base station 120 even if the mobile terminal 130 requests the call setup after the Quick-Config message 145 has been constructed by the base station 120.

The example methodologies can best be understood from the timing diagram of FIG. 5. Referring to FIG. 5, timing t1 (which is the aforementioned first timing or control channel buildback time) represents a time when base station 120 application software constructs the QuickConfig message 145 for transmission at t4 (which is the aforementioned second timing or control channel start time, e.g., the start time of the next control channel cycle).

The QuickConfig message 145 has one FTValid bit for each traffic channel that can be opened on a base station 120. In the current or conventional implementation, the values for the FTValid bits in this message are filled based on the set of traffic channels open on this base station 120 at this instant. Thus, in this example, the QuickConfig message 145 constructed at t1 does not contain the traffic channel opened for a given mobile terminal 130 at t2 in its set of open traffic channels, for filling the appropriate FTValid bit.

Timing t2 is the time when the traffic channel allocation to the mobile terminal 130 actually occurs at the base station 120. Timing t3 is the time when the (TCA) message is constructed and sent to the mobile terminal 130. The TCA message contains the FTValid bit number which is used by the mobile terminal 130 for FTCMAC layer supervision along with other purposes. When this mobile terminal 130 receives the TCA message, it is assumed to be on the traffic channel and can use the traffic channel to exchange data with the base station 120. This mobile terminal 130 will thus start its FTCMAC layer supervision at this instant.

At timing t4, this is when the QuickConfig message 145 (which was constructed at timing t1) is sent over the air interface 115 to all mobile terminals 130 being served by the base station 120 in its cell 110. All mobile terminals 130 that have received the TCA message (which includes the first mobile terminal 130 in this example) use this message (in particular the FTValid bit in this message) for their FTCMAC layer supervision.

It can be seen from the above example that since the QuickConfig message 145 used by the mobile terminal 130 for FTCMAC layer supervision was constructed at t1 (a time when the first mobile terminal's 130 traffic channel was not even open on the base station 120, the FTCMAC layer supervision will fail at t4 for this mobile terminal 130, if the existing method for QuickConfig message 145 construction is used.

However, with the proposed methodology herein, the FTValid bit would have already be set to 1 (performed when the QuickConfig message 145 was constructed at t1) for the traffic channel being opened for mobile terminal 130 at t2, enabling the mobile terminal 130's FTCMAC layer supervision to pass at t4. Thus, any mobile terminal 130 requesting to set up a call in the control channel build interval T (i.e., between a timing t1 when the base station is commanded to construct the QuickConfig message 145 and the timing t4 at which the constructed QuickConfig message 145 is broadcast to the mobile terminals 130) receives the QuickConfig message 145 with the FTValid bit set to the default logic high value.

An alternate method of addressing this problem would be to send the TCA message at a timing t5 (after the start time of the next control channel cycle at timing t4). The mobile terminal 130 would start its FTCMAC layer supervision at t5 and would look at the next QuickConfig message 145 received (which would be at the next start time for a control channel cycle at timing t4') for the FTValid bit value and supervision failure would not occur in this case. However, it can be observed that this means that the mobile terminal 130 would incur an additional delay of (t5-t3) for traffic channel setup. As discussed previously, this may be unacceptable for delay sensitive applications such as Push To Talk (PTT).

During de-allocation there could be two scenarios. The first scenario is where the network 100 has confirmation that the mobile terminal 130 has closed its connection to the network via a response to a ConnectionClose command from the base station 120. In this case, the MACIndex resource is de-allocated immediately; thus the FTValid bit in the QuickConfig message is not changed; it can be retained at true ("1") because the mobile terminal 130 is no longer reading this bit. In other words, the FTValid bit is monitored by a mobile terminal 130 only if it has been allocated the MACIndex corresponding to that bit. Since the MACIndex has been de-allocated due to the confirmation of a closed connection, the bit is not read by the mobile terminal 130.

The second scenario is where the network 100 doesn't yet have confirmation that the mobile terminal 130 has closed its connection. In this second case, the MACIndex resource is retained by the base station 120 for some period M at the end of which there is notification from the driver for a processor (such as an ASIC) in the base station 120 that does the EV-DO baseband processing that the MACIndex is de-allocated. During this retaining interval M, the FTValid bit is thus set to false by software in the base station 120 so that the mobile terminal 130 will monitor the FTValid bit according to its assigned MacIndex, and thus drops the call as expected by the standard. At the end of period M the FTValid bit is reset to true by software on the base station 120.

Setting the FTValid bit to true by default has no apparent negative consequences since an FTValid bit is monitored by a mobile terminal 130 only if it has been allocated the MACIndex corresponding to that bit. Otherwise the bit is not read by any mobile terminal 130.

The example methodology may reduce call and handoff failures rates in EV-DO systems without introducing additional call setup latencies. The control channel build interval T can be set on the order of 20 slots (slot=1.66 ms). Since the control channel cycle has 256 slots, about 20/256 or about 8% of calls have the potential to hit this scenario, i.e., where a traffic channel allocation happening during the control channel build interval T. In other words, call failure rates could be reduced by 8% in the worst case scenario where there is a significant control channel build interval T such as 20 slots for example, without causing additional delays. Lower latencies also mean improved utilization of system resources thereby allowing the network 100 to serve more users.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of constructing a QuickConfig message in a 1x Evolution (1XEV) data only (EV-DO) communication network for broadcast by a base station of the network to a plurality of users served thereby, comprising:
    setting a Forward Traffic Valid (FTValid) bit in a field of the QuickConfig message to a default value of a logic high state for all users,
    if the network does not have confirmation that a given user has closed its connection, maintaining a Media Access Control Index (MACIndex) resource for the given user at the base station for a given period M, at the end of which the MACIndex is de-allocated, and
    toggling the FTValid bit to a logic low state during the period M so that the given user monitors the bit according to its assigned MacIndex and drops the call.

2. The method of claim 1, wherein any user requesting to set up a call between a time when the base station is commanded to construct the QuickConfig message and a time at which the constructed QuickConfig message is broadcast to the users receives the QuickConfig message with the FTValid bit set to the default logic high.

3. The method of claim 1, further comprising, if the network has confirmation that a given user has closed its connection to the network,
    maintaining the FTValid bit in the QuickConfig at its default value of the logic high state.

4. A method of reducing call and handoff failure rates in a 1xEV-DO communication network without introducing additional call setup latencies, comprising:
    setting a FTValid bit in a field of the QuickConfig message being constructed by a base station of the network to a default value of a logic high state for all users being served by the base station in the network,
    transmitting the QuickConfig message to the users being served thereby, wherein no delay occurs for a call setup between a given user and the base station even if the user requests the call setup after the QuickConfig message has been constructed by the base station,
    if the network does not have confirmation that a given user has closed its connection, maintaining a Media Access Control Index (MACIndex) resource for the given user at the base station for a given period M, at the end of which the MACIndex is de-allocated, and
    toggling the FTValid bit to a logic low state during the period M so that the given user monitors the bit according to its assigned MACIndex and drops the call.

5. The method of claim 4, wherein any user requesting to set up a call between a time when the base station is commanded to construct the QuickConfig message and a time at which the constructed QuickConfig message is broadcast to the users receives the QuickConfig message with the FTValid bit set to the default logic high.

6. The method of claim 4, further comprising, if the network has confirmation that a given user has closed its connection to the network,
    maintaining the FTValid bit in the QuickConfig at its default value of the logic high state.

* * * * *